US005851270A

United States Patent [19]

Olander

[11] Patent Number: 5,851,270

[45] Date of Patent: Dec. 22, 1998

[54] LOW PRESSURE GAS SOURCE AND DISPENSING APPARATUS WITH ENHANCED DIFFUSIVE/EXTRACTIVE MEANS

[75] Inventor: W. Karl Olander, New Milford, Conn.

[73] Assignee: Advanced Technology Materials, Inc., Danbury, Conn.

[21] Appl. No.: 859,173

[22] Filed: May 20, 1997

Related U.S. Application Data

[60] Provisional application No. 60/017,970 May 20, 1996.

[51] Int. Cl. [6] .......... B01D 53/04

[52] U.S. Cl. .......... 96/144; 96/108; 96/139; 96/152

[58] Field of Search .......... 96/108, 130, 134–144, 96/152

[56] References Cited

U.S. PATENT DOCUMENTS

| | | | |
|---|---|---|---|
| 240,423 | 4/1881 | James | 206/0.7 X |
| 1,608,155 | 11/1926 | Barnebey | 206/0.7 X |
| 1,714,245 | 5/1929 | Schaefer | 96/146 X |
| 2,225,990 | 12/1940 | Henry | 96/137 X |
| 2,283,043 | 5/1942 | Busch | 96/140 |
| 2,356,334 | 8/1944 | Maude et al. | 206/0.7 X |
| 2,450,289 | 9/1948 | Marek | 96/146 X |
| 2,626,675 | 1/1953 | Maher | 96/144 |
| 2,663,626 | 12/1953 | Spangler | 206/0.7 X |
| 2,698,061 | 12/1954 | Jaubert | 96/136 |
| 2,987,139 | 6/1961 | Bush | 95/133 |
| 2,997,371 | 8/1961 | Wadsworth et al. | 95/131 X |
| 3,006,153 | 10/1961 | Cook | 206/0.7 X |
| 3,080,307 | 3/1963 | Rinald | 96/127 X |
| 3,093,564 | 6/1963 | Weisman et al. | 96/127 X |
| 3,116,132 | 12/1963 | Haller et al. | 95/132 X |
| 3,144,200 | 8/1964 | Taylor et al. | 96/108 X |
| 3,176,444 | 4/1965 | Kiyonaga | 95/97 X |
| 3,252,270 | 5/1966 | Pall et al. | 96/134 X |
| 3,264,803 | 8/1966 | Read | 96/146 X |
| 3,287,432 | 11/1966 | Sensel | 95/95 |
| 3,415,069 | 12/1968 | Hauser | 96/126 X |
| 3,469,375 | 9/1969 | Barrington et al. | 96/146 X |

(List continued on next page.)

FOREIGN PATENT DOCUMENTS

| | | | |
|---|---|---|---|
| 0 093 885 A2 | 11/1983 | European Pat. Off. . | |
| 2336628 | 12/1976 | France . | |
| 2 444 881 | 7/1980 | France . | |
| 2580376 | 10/1986 | France . | |
| 1095796 | 12/1960 | Germany | 95/133 |
| 2264512 | 1/1974 | Germany | 95/133 |
| 3139-781 | 4/1983 | Germany | 96/122 |
| DE4439782A1 | 5/1995 | Germany . | |
| 52-72373 | 6/1977 | Japan | 96/130 |
| 61-133116 | 6/1986 | Japan | 96/126 |
| 63-88017 | 4/1988 | Japan | 96/121 |
| 3-127606 | 5/1991 | Japan | 96/108 |
| 1181692A | 9/1985 | U.S.S.R. | 95/133 |
| 1544475A1 | 2/1990 | U.S.S.R. | 95/131 |
| 1583151A1 | 8/1990 | U.S.S.R. | 95/133 |

OTHER PUBLICATIONS

"Beaded Carbon UPS Solvent Recoery", *Chemical Engineering*, vol. 84, No. 18, pp. 39–40, Aug. 29, 1 977 (copy of 96/126).

*Primary Examiner*—Robert Spitzer
*Attorney, Agent, or Firm*—Oliver A.M. Zitzmann; Steven J. Hultquist

[57] ABSTRACT

A gas storage and dispensing system in which a gas is sorptively retained on a bed of physical adsorbent material in a containment vessel, and gas is desorbed for selective dispensing thereof from the vessel. The vessel is equipped for gas discharge, with a valve head, mass flow controller, regulator assembly, or the like. A gas-flow resistance-reducing structure such as a gas-permeable porous tube, inert packing, or dispersed inert material, is provided within the vessel, to reduce the resistance to flow of desorbed gas from the bed of adsorbent material during the dispensing operation.

20 Claims, 4 Drawing Sheets

U.S. PATENT DOCUMENTS

| | | | |
|---|---|---|---|
| 3,490,205 | 1/1970 | Hauser | 96/126 |
| 3,527,027 | 9/1970 | Knight et al. | 96/134 |
| 3,675,392 | 7/1972 | Reighter | 95/96 |
| 3,713,273 | 1/1973 | Coffee | 96/128 X |
| 3,719,026 | 3/1973 | Sand | 95/106 |
| 3,776,283 | 12/1973 | Kramer et al. | 96/113 X |
| 3,788,036 | 1/1974 | Lee et al. | 96/130 X |
| 3,868,239 | 2/1975 | Visser | 96/152 |
| 3,925,248 | 12/1975 | Moroni et al. | 96/135 X |
| 4,023,701 | 5/1977 | Dockery | 206/0.7 X |
| 4,168,149 | 9/1979 | Armond et al. | 95/96 X |
| 4,263,018 | 4/1981 | McCombs et al. | 96/130 X |
| 4,310,601 | 1/1982 | Bernauer et al. | 423/566 |
| 4,343,770 | 8/1982 | Simons | 206/0.7 X |
| 4,414,005 | 11/1983 | DeBiévre et al. | 95/127 |
| 4,477,265 | 10/1984 | Kumar et al. | 95/96 X |
| 4,489,564 | 12/1984 | Hausler et al. | 62/43 |
| 4,552,571 | 11/1985 | Dechene | 95/96 X |
| 4,578,256 | 3/1986 | Nishino et al. | 95/133 X |
| 4,673,415 | 6/1987 | Stanford | 95/96 X |
| 4,713,100 | 12/1987 | Haruna et al. | 96/143 |
| 4,723,967 | 2/1988 | Tom | 96/108 X |
| 4,738,693 | 4/1988 | Tom | 96/108 X |
| 4,738,694 | 4/1988 | Godino et al. | 96/126 X |
| 4,744,221 | 5/1988 | Knollmueller | 62/48 |
| 4,749,384 | 6/1988 | Nowobilski et al. | 92/108 X |
| 4,761,395 | 8/1988 | Tom et al. | 502/401 |
| 4,867,770 | 9/1989 | Feeney | 96/137 |
| 4,869,733 | 9/1989 | Stanford | 95/96 X |
| 4,881,958 | 11/1989 | Eckardt et al. | 96/127 |
| 5,002,596 | 3/1991 | Moskaitis et al. | 96/152 |
| 5,051,117 | 9/1991 | Prigge et al. | 95/95 |
| 5,089,244 | 2/1992 | Parent et al. | 95/133 X |
| 5,114,440 | 5/1992 | Reiss | 95/96 |
| 5,133,787 | 7/1992 | Diot et al. | 96/121 |
| 5,135,551 | 8/1992 | Fielding | 96/136 X |
| 5,151,395 | 9/1992 | Tom | 502/67 |
| 5,169,528 | 12/1992 | Karbachsch et al. | 96/135 X |
| 5,202,096 | 4/1993 | Jain | 96/126 X |
| 5,224,350 | 7/1993 | Mehra | 95/96 X |
| 5,238,469 | 8/1993 | Briesacher et al. | 96/126 X |
| 5,385,689 | 1/1995 | Tom et al. | 252/194 |
| 5,409,526 | 4/1995 | Zheng et al. | 96/132 |
| 5,417,742 | 5/1995 | Tamhankar et al. | 95/96 |
| 5,518,528 | 5/1996 | Tom et al. | 95/103 |
| 5,681,370 | 10/1997 | McMahon | 95/106 X |
| 5,704,965 | 1/1998 | Tom et al. | 95/95 |

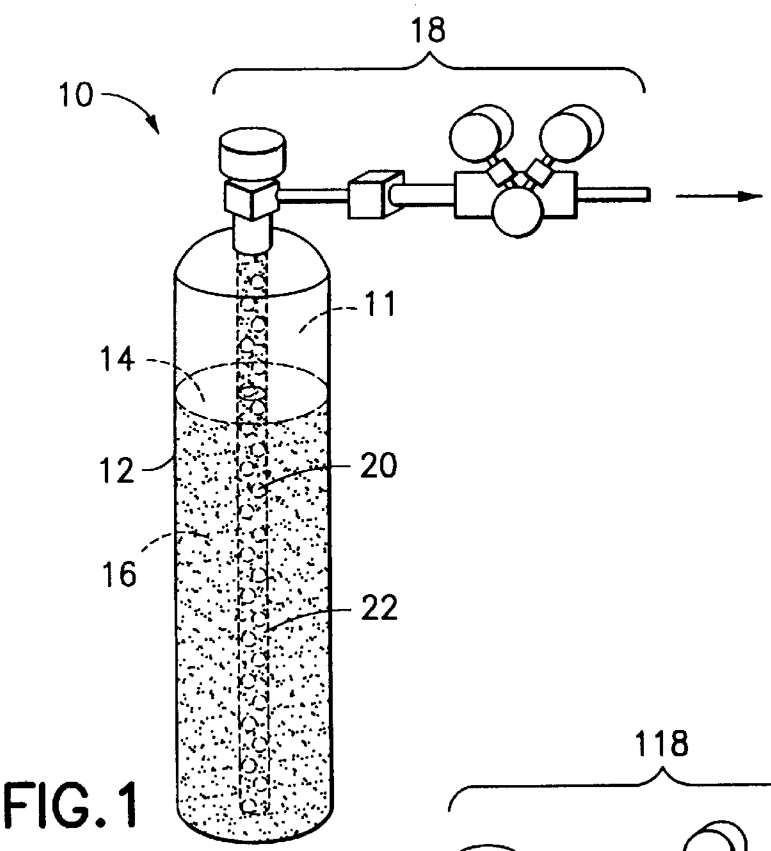
FIG. 1
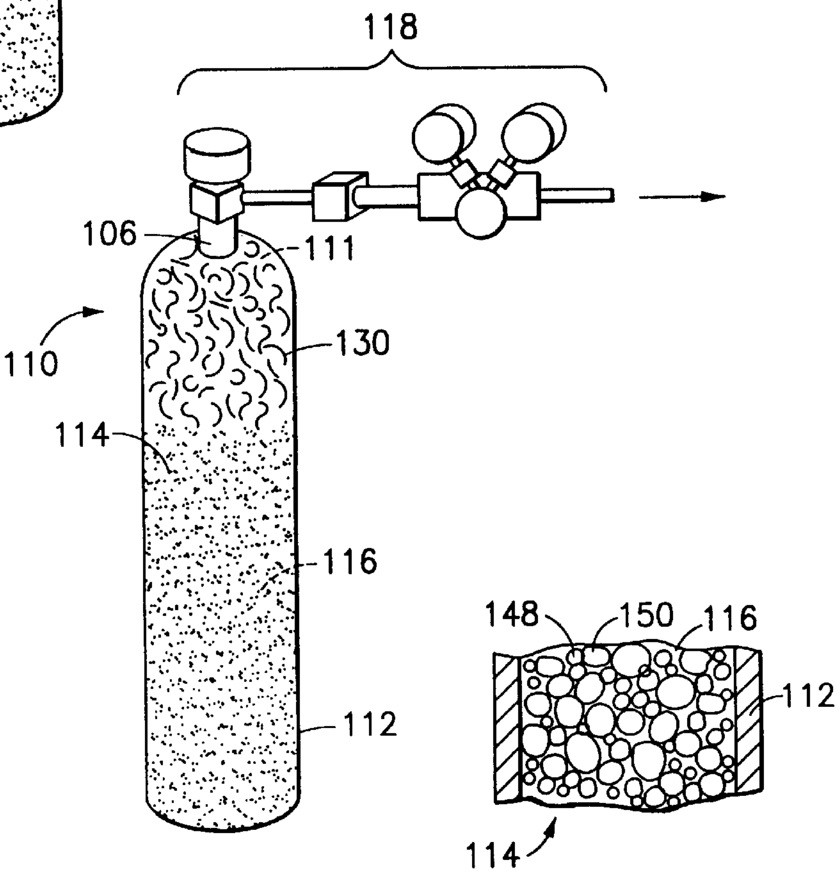
FIG. 2
FIG. 3

LOW PRESSURE GAS SOURCE AND DISPENSING APPARATUS WITH ENHANCED DIFFUSIVE/EXTRACTIVE MEANS

CROSS-REFERENCE TO RELATED APPLICATION

This application is based on and claims the priority of United States Provisional patent application Ser. No. 60/017,970 filed May 20, 1996.

BACKGROUND OF THE INVENTION

1. Field of the Invention

This invention relates generally to storage and dispensing systems for the selective dispensing of fluids from a vessel or storage container in which the fluid component(s) are sorptively retained by a solid sorbent medium, and are desorptively released from the sorbent medium in the dispensing operation.

2. Description of the Related Art

In a wide variety of industrial processes and applications, there is a need for a reliable source of process fluid(s) which is compact, portable, and available to supply the fluid(s) on demand. Such processes and applications include semiconductor manufacturing, ion implantation, manufacture of flat panel displays, medical treatment, water treatment, emergency breathing equipment, welding operations, space-based applications involving delivery of liquids and gases, etc.

U.S. Pat. No. 4,744,221 issued May 17, 1988 to Karl O. Knollmueller discloses a method of storing and subsequently delivering arsine, by contacting arsine at a temperature of from about −30° C. to about +30° C. with a zeolite of pore size in the range of from about 5 to about 15 Angstroms to adsorb arsine on the zeolite, and then dispensing the arsine by heating the zeolite to an elevated temperature of up to about 175° C. for sufficient time to release the arsine from the zeolite material.

The method disclosed in the Knollmueller patent is disadvantageous in that it requires the provision of heating means for the zeolite material, which must be constructed and arranged to heat the zeolite to sufficient temperature to desorb the previously sorbed arsine from the zeolite in the desired quantity.

The use of a heating jacket or other means exterior to the vessel holding the arsine-bearing zeolite is problematic in that the vessel typically has a significant heat capacity, and therefore introduces a significant lag time to the dispensing operation. Further, heating of arsine causes it to decompose, resulting in the formation of hydrogen gas, which introduces an explosive hazard into the process system. Additionally, such thermally-mediated decomposition of arsine effects substantial increase in gas pressure in the process system, which may be extremely disadvantageous from the standpoint of system life and operating efficiency.

The provision of interiorly disposed heating coil or other heating elements in the zeolite bed itself is problematic since it is difficult with such means to uniformly heat the zeolite bed to achieve the desired uniformity of arsine gas release.

The use of heated carrier gas streams passed through the bed of zeolite in its containment vessel may overcome the foregoing deficiencies, but the temperatures necessary to achieve the heated carrier gas desorption of arsine may be undesirably high or otherwise unsuitable for the end use of the arsine gas, so that cooling or other treatment is required to condition the dispensed gas for ultimate use.

U.S. Pat. No 5,518,528 issued May 21, 1996 in the names of Glenn M. Tom and James V. McManus, describes a gas storage and dispensing system, for the storage and dispensing of gases, e.g., hydride gases, halide gases, organometallic Group V compounds, etc. which overcomes various disadvantages of the gas supply process disclosed in the Knollmueller patent. The gas storage and dispensing system of the Tom et al. patent comprises an adsorption-desorption apparatus, for storage and dispensing of gases, including a storage and dispensing vessel holding a solid-phase physical sorbent, and arranged for selectively flowing gas into and out of the vessel. A sorbate gas is physically adsorbed on the sorbent. A dispensing assembly is coupled in gas flow communication with the storage and dispensing vessel, and provides, exteriorly of the vessel, a pressure below the vessel's interior pressure, to effect desorption of sorbate from the solid-phase physical sorbent medium, and flow of desorbed gas through the dispensing assembly. Heating means may be employed to augment the desorption process, but as mentioned above, heating entails various disadvantages for the sorption/desorption system, and it therefore is preferred to operate the Tom et al. system with the desorption being carried out at least partially by pressure differential-mediated release of the sorbate gas from the sorbent medium.

The storage and dispensing vessel of the Tom et al. patent embodies a substantial advance in the art, relative to the prior art use of high pressure gas cylinders. Conventional high pressure gas cylinders are susceptible to leakage from damaged or malfunctioning regulator assemblies, as well as to rupture and unwanted bulk release of gas from the cylinder if the internal gas pressure in the cylinder exceeds permissible limits. Such overpressure may for example derive from internal decomposition of the gas leading to rapid increasing interior gas pressure in the cylinder.

The gas storage and dispensing vessel of the Tom et al. patent thus reduces the pressure of stored sorbate gases by reversibly adsorbing them onto a carrier sorbent, e.g., a zeolite or activated carbon material.

The storage and dispensing vessel of the Tom et al. system typically comprises a cylinder or gas vessel of vertically elongate character, e.g., with an aspect ratio of height to diameter (each being measured in the same dimensional units) which may for example be in the range of 3 to 6. Although the dispensing flow circuitry associated with such storage and dispensing vessel may be widely varied, it is common to deploy a frit of porous sintered metal at the junction of the flow conduit with the vessel. The frit interposes a physical filtering barrier to the egress of particulate solids from the sorbent bed during desorption/dispensing of gas from the vessel. Since the gas is discharged from the storage and dispensing vessel through the frit at only one end of the vessel, the delivery rate of dispensed gas may be inhibited if the escaping gas molecules are mass transport limited. Gas stored in the bottom of the vessel has to sorptively/desorptively "work" its way to the top of the vessel. Along such path, the gas may be retarded or prevented from discharge by the numerous gas adsorption sites presented by the sorbent bed (between the lower end of the vessel and the upper end of the vessel which is coupled with the external gas flow circuitry).

Accordingly, at high discharge rates, and even during normal operation in some instances, the delivery capacity of the gas storage and dispensing vessel may be mass transport limited and less than optimal.

It therefore is an object of the present invention to provide an improved storage and dispensing fluid supply system of the type disclosed in the Tom et al. patent, which obviates the above-described mass transfer limitation problems.

Other objects and advantages of the invention will be more fully apparent from the ensuing disclosure.

SUMMARY OF THE INVENTION

The present invention relates to a system for storage and dispensing of a sorbable fluid, comprising a storage and dispensing vessel constructed and arranged to hold a solid-phase physical sorbent medium having a sorptive affinity for the sorbable fluid, and for selectively flowing sorbable fluid into and out of such vessel. A solid-phase physical sorbent medium having a sorptive affinity for the fluid is disposed in the storage and dispensing vessel at an interior gas pressure. The sorbable fluid is physically adsorbed on the sorbent medium. A dispensing assembly is coupled in gas flow communication with the storage and dispensing vessel, and constructed and arranged for selective on-demand dispensing of desorbed fluid, after thermal and/or pressure differential-mediated desorption of the fluid from the carbon sorbent material, with the dispensing assembly being constructed and arranged:

(I) to provide, exteriorly of said storage and dispensing vessel, a pressure below said interior pressure, to effect desorption of fluid from the carbon sorbent material, and flow of desorbed fluid from the vessel through the dispensing assembly; and/or (II) to flow thermally desorbed fluid therethrough, and comprising means for heating the carbon sorbent material to effect desorption of the fluid therefrom, so that the desorbed fluid flows from the vessel into the dispensing assembly.

In one aspect of the invention, the fluid discharge characteristics of the fluid storage and delivery vessel are improved by a "channelized" sorbent bed in the storage/dispensing vessel, providing enhanced pathway(s) for egress of the stored fluid from the vessel into the associated exterior dispensing flow circuitry.

In one embodiment of such aspect, a fluid-permeable flow conduit is provided in the interior volume of the storage/dispensing vessel. The flow conduit has fluid-permeable, e.g., porous or foraminous, wall surface and extends from a lower portion of the gas storage and dispensing vessel to an outlet of the vessel at an upper portion thereof (the term "outlet" being understood here as referring to the port or opening at which the vessel is joined to the dispensing assembly). The dispensing assembly is coupled to the storage/dispensing vessel to provide an exterior flow path, comprising means such as conduits, flow channels, regulators, couplings, valves and/or other structures joined to the vessel for conveying dispensed fluid therefrom to a locus exterior of the vessel.

The flow conduit deployed in the interior volume of the storage/dispensing vessel thus provides a non-sorptive flow path along which the gas contained in the vessel flows to the vessel outlet for dispensing, but without contacting the sorbent medium along such non-sorptive (sorbent-free) path.

As a result, the interiorly disposed flow conduit allows ingress of the desorbed fluid and any interstitial fluid in proximity thereto, through the fluid-permeable wall of the conduit, so that the fluid can flow without obstruction to the outlet of the vessel. The fluid-permeable wall of the flow conduit may be formed of a porous medium, e.g., formed of metal, ceramic, composite material, etc., or a continuous solid wall having perforations, openings, porosity, etc. therein.

The fluid-permeable flow conduit may comprise a series of individual branch conduits of fluid-permeable character, which are disposed in the interior volume of the vessel across the cross-section of the elongate vessel, and which serve as feeder lines to effect the channelized, sorbent-free flow of the desorbate and interstitial fluid from the vessel.

The fluid-permeable conduit affords a low pressure drop pathway for flow of the desorbing fluid to the outlet of the vessel.

In a preferred embodiment, a foraminous walled conduit is centrally disposed in the interior volume of the vessel and extends upwardly from the lower end of the interior volume of the vessel to the upper end of the vessel. By such arrangement, diffusional and convective bulk flow of the desorbate fluid moves radially toward the center of the gas storage and dispensing vessel and the gas then up the fluid-permeable conduit to the vessel outlet.

In another embodiment of such aspect of the invention, enhanced flow pathways for the sorbate gas in the interior volume of the vessel are provided by mixing an amount of an inert material (e.g., chemically inert glass beads) with the sorbent material.

As used herein, the term "inert" means that the appertaining material is non-sorptive of, and nonreactive with, the fluid(s) being sorptively stored in and dispensed from the vessel. The inert material has a packing characteristic creating interstitial space comprising void volumes communicating with one another, to form a multiplicity of non-sorptive fluid flow paths therethrough.

The inert packing material may be localized in discrete deposits or interspersed through the sorbent material. The inert material may also be provided in an upper portion of the interior volume of the vessel, above the bed of sorbent material, to enhance the disengagement of the fluid from the sorbent material, by providing a head space or reservoir for the desorbed fluid.

The use of packing material at the top of the cylinder may also have utility in leveling the amount of sorbent so that regardless of variations in cylinder volume or sorbent loading capacity, the vessel will always load a constant amount of sorbate fluid.

Although generally preferred to operate solely by pressure differential, in respect of the sorption and desorption of the fluid to be subsequently dispensed, the system of the invention may in some instances advantageously employ a heater operatively arranged in relation to the storage and dispensing vessel for selective heating of the solid-phase physical sorbent medium, to effect thermally-enhanced desorption of the sorbate fluid from the solid-phase physical sorbent medium.

Although any suitable sorbent materials having sorptive affinity for the fluid of interest may be employed, preferred solid-phase physical sorbent media include crystalline aluminosilicate compositions and other so-called molecular sieves, silica, alumina, macroreticulate polymers, kieselguhr, carbon, etc., with crystalline aluminosilicate compositions (zeolites) and carbon sorbent materials being most preferred. Preferred carbon materials include so-called bead activated carbon of highly uniform spherical particle shape.

More specifically, the invention in one aspect relates to a gas storage and dispensing system, comprising:

- a vessel defining an interior volume therewithin for containing a bed of sorbent material having affinity for a gas to be stored and selectively dispensed from the vessel;
- means for selectively establishing gas flow communication for discharge of such gas from the vessel; and means disposed in the interior volume of the vessel for reducing the resistance to flow of gas from the sorbent material bed during establishment of gas flow communication for discharge of gas from the vessel.

The means for selectively establishing gas flow communication for discharge of said gas from the vessel, may suitably comprise a valve which is selectively actuatable between open and closed flow positions, a mass flow controller for regulating the rate of flow of gas from the vessel, or other suitable flow controllers and flow regulating devices commonly employed in the art of gas dispensing from source vessels.

The means disposed in the interior volume of the vessel for reducing the resistance to flow of gas from the sorbent material bed during establishment of gas flow communication for discharge of gas from the vessel, may suitably comprise an inert packing material in the interior volume of the vessel which is permeable to gas flow, an inert material dispersed in the sorbent material bed such as glass beads or other suitable divided or discontinuous material, or a permeable diffusion tube positioned in the sorbent bed for flowing gas out of the sorbent bed in the discharge of gas from the vessel, or any other suitable means by which the resistance to flow of gas through the sorbent bed is reduced in relation to a corresponding system lacking such means.

In a particularly preferred aspect, the present invention relates to a gas storage and dispensing system, comprising:

a vertically upstanding cylindrical vessel defining an interior volume therewithin containing a bed of sorbent material having affinity for a gas to be stored and selectively dispensed from the vessel;

means for selectively establishing gas flow communication for top-end discharge of said gas from the vessel, including a gas discharge port at a top end of the vessel and a gas flow controller coupled to the gas discharge port; and a porous tube permeable to gas flow, coupled to the gas discharge port and extending downwardly in the interior volume of the vessel, for reducing the resistance to flow of gas from the sorbent material bed during establishment of gas flow communication for discharge of gas from the vessel.

Other aspects and features of the invention will be more fully apparent from the ensuing disclosure.

BRIEF DESCRIPTION OF THE DRAWINGS

FIG. 1 is a schematic perspective representation of a storage and dispensing vessel and associated flow circuitry according to one embodiment of the invention, featuring a porous tube centrally disposed in the storage and dispensing vessel and connected to a flow regulator dispensing assembly which is secured to the outlet at the upper end of the vessel.

FIG. 2 is a schematic perspective representation of a storage and dispensing system according to another embodiment of the invention, comprising an inert packing material in the interior volume of the storage and dispensing vessel.

FIG. 3 is a sectional elevation view of a portion of the sorbent bed in the storage and dispensing vessel of FIG. 2, showing the interspersed mixture of inert packing material and the sorbent medium.

DETAILED DESCRIPTION OF THE INVENTION, AND PREFERRED EMBODIMENTS THEREOF

Figure 4:
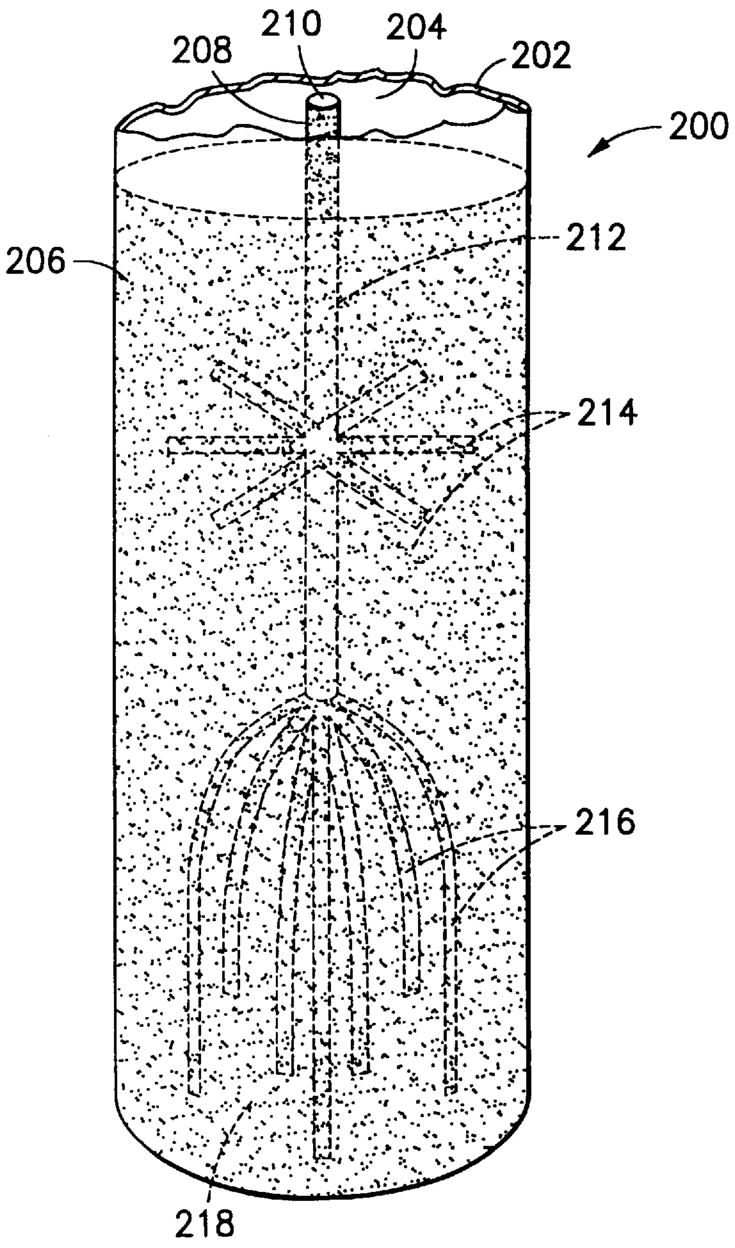
FIG. 4 is a perspective schematic view of a storage and dispensing vessel according to another embodiment of the invention, comprising a "spider" arrangement of porous branch tubes communicating with a central flow-enhancing porous main tube, in another embodiment of the invention.

The disclosure of U.S. Pat. No. 5,518,528 issued May 21, 1996 in the names of Glenn M. Tom and James V. McManus, and the disclosure of U.S. patent application Ser. No. 08/650,634 filed May 20, 1996 in the names of Glenn M. Tom and James V. McManus for "FLUID STORAGE AND DELIVERY SYSTEM UTILIZING CARBON SORBENT MEDIUM," hereby are incorporated herein by reference in their entirety.

In the ensuing disclosure, the invention will be described with reference to a gas as the sorbate fluid, however, it will be recognized that the invention is broadly applicable to liquids, gases, vapors, and multiphase fluids, and contemplates storage and dispensing of fluid mixtures as well as single component fluids.

Referring now to the drawings, FIG. 1 is a schematic representation of a storage and dispensing system 10 comprising storage and dispensing vessel 12. The storage and dispensing vessel may for example comprise a conventional gas cylinder container of elongate character. In the interior volume of such vessel is disposed a bed 14 of a suitable sorbent medium 16.

The sorbent medium 16 may comprise any suitable sorptively effective material, having sorptive affinity for the fluid to be stored and subsequently dispensed from the vessel 12, and from which the sorbate is suitably desorbable. Examples include a crystalline aluminosilicate composition, e.g., a micropore aluminosilicate composition with a pore size in the range of from about 4 to about 13 Å, a mesopore crystalline aluminosilicate composition with a pore size in the range of from about 20 to about 40 Å, a carbon sorbent material such as a bead activated carbon sorbent of highly uniform spherical particle shape, e.g., BAC-MP, BAC-LP, and BAC-G-70R bead carbon materials (Kureha Corporation of America, New York, N.Y.), silica, alumina, macroreticulate polymers, kieselguhr, etc.

The sorbent material may be suitably processed or treated to ensure that it is devoid of trace components which may deleteriously affect the performance of the fluid storage and dispensing system. For example, the sorbent may be subjected to washing treatment, e.g., with hydrofluoric acid, to render it sufficiently free of trace components such as metals and oxidic transition metal species.

The gas cylinder container 12 as shown is connected at its upper end to a gas regulator assembly 18 comprising pressure monitoring and flow control elements of conventional arrangement. Within the interior volume 11 of the vessel is disposed a porous metal tube 20. The porous metal tube is centrally arranged in the interior volume of the storage and dispensing vessel, extending from a lower region of the interior volume of the vessel, vertically upwardly to its junction with the gas regulator assembly 18. The tube 20 has a series of openings 22 therein, along its length. The portion of the tube that is disposed in the adsorbent bed 14 of sorbent material 16 may have openings that are appropriately sized in relation to the particles of the sorbent medium therein, so that such openings are not plugged or occluded by the sorbent bed particles.

The porous metal tube in the embodiment of FIG. 1 may be of any appropriate size and dimensions suitable for the particular gas storage and dispensing system employed in a given end use application.

As an alternative to the porous metal tube shown in the embodiment of FIG. 1, the tube may comprise a porous sintered metal member, an elongate frit member, or any other fluid-permeable structure which affords the fluid being dispensed an upwardly extending channel which extends through the sorbent mass and which is devoid of sorbent medium therein. In such sorbent-free channel, the gas can flow without obstruction from the sorbent medium, so that the radial diffusive flux of fluid into such channel permits fluid to move upwardly toward the outlet of the fluid/sorbent containment vessel, under an applied pressure differential including a lower pressure exterior of the vessel which effects hydrodynamic flow of the gas from the vessel to an exterior dispensing locus, with in situ desorption of the gas from the sorbent medium in the interior volume of the vessel.

The gas vessel 12 shown in FIG. 1 is of vertically elongate character, and may for example have an aspect ratio of height to diameter (each being measured in the same dimensional units) of from about 3 to about 6. It will be recognized, however, that the vessel may be of widely varying type (size, shape and dimensions), within the broad practice of the present invention. FIG. 2 is a schematic perspective representation of a storage and dispensing system 110 according to another embodiment of the invention, comprising an inert packing material 130 in the upper region of the interior volume 111 of the storage and dispensing vessel 112.

The inert packing material, e.g., a porous foam material, a sintered glass matrix, or other inert packing material, serves to provide a sorbent-free head space for flow of desorbate gas, from the bed 114, containing sorbent medium 116 having sorptive affinity for the gas, to the port 106 of the vessel.

Port 106 of the vessel is coupled in a known manner with the regulator assembly 118, which then can be manually or automatically adjusted to effect pressure differential-mediated flow of the gas from the vessel, through the regulator assembly, and to the downstream dispensing locus.

The use of packing material 130 in the top of the vessel 112 also has utility in leveling the amount of sorbent 116, so that regardless of variations in vessel volume or sorbent loading capacity, the storage and dispensing vessel will always load a constant amount of sorbate gas.

The sorbent material 116 in the vessel may also be enhanced to provide improved efflux of desorbate gas from the sorbent material 116 under dispensing conditions, as shown in FIG. 3.

FIG. 3 is a sectional elevation view of a portion of the sorbent bed 114 comprising sorbent material 116 in the storage and dispensing vessel 112 of FIG. 2. As shown, the bed 114 comprises an interspersed mixture of inert packing material, in the form of glass beads 150, and the sorbent medium particles 148.

The inert packing material in this embodiment thus is intimately interspersed in a suitable finely divided form throughout the bed 116 of sorbent material. The sorbent material likewise may be in particulate or other discrete particle form, e.g., of pellet or bead character.

The glass bead packing material is appropriately sized and shaped to introduce significant interstitial interconnected void volume in the sorbent bed. Such interstitial interconnected void volume thus provides channels through the sorbent bed 114 for enhanced efflux of the sorbate fluid from the sorbent bed.

The presence of the inert packing material thus enhances the upward flux of the sorbate fluid under desorption and dispensing conditions, relative to a corresponding bed lacking such inert packing material enhancement.

In the absence of the packing material, the sorbent medium would pack in a manner which has interstitial volume bounded solely by the sorbent medium particles, and which thus would provide significant resorptive interaction with molecules of the fluid after its initial desorption. The repeated interaction of the sorptive medium thus forms a significant mass flow resistance, which in storage of the fluid is desirable for holding the gas in inventory, but which in dispensing mode serves to retard the desired efflux of fluid from the storage and dispensing vessel.

It will therefore be apparent that the “channelization” of the interior volume in the gas storage and dispensing vessel of the invention, permits a more rapid and greater efflux of the dispensed fluid from the vessel under dispensing conditions, than does the prior art storage and dispensing vessel lacking the efflux enhancement of the present invention. The efflux enhancement of the present invention, as illustratively shown herein, may be embodied in a variety of forms for various specific applications.

FIG. 4 is a perspective schematic view of a storage and dispensing vessel 200 according to another embodiment of the invention, comprising a “spider” arrangement of porous branch tubes communicating with a central flow-enhancing porous main tube, in another embodiment of the invention.

The storage and dispensing vessel 200 shown in FIG. 4 comprises a vessel wall 202 of cylindrical shape defining therewithin an interior volume 204. In the interior volume 204 is disposed a bed 206 of sorbent material having sorptive affinity for the fluid to be stored in and selectively dispensed from the vessel. The sorbent bed comprises a particulate sorbent medium of suitable material.

Disposed in the sorbent bed 206 is a fluid-permeable efflux tube 208 comprising a main elongate vertically extending main flow tube 212 having a central bore 210 therein for flow of the desorbate fluid upwardly to the discharge port and the dispensing assembly of the vessel (not shown in FIG. 4). The main flow tube may be of a porous sintered metal construction, with a bounding wall surface allowing permeation therethrough into the central bore 210 of the fluid to be dispensed.

As shown, the main flow tube 212 is provided with a series of branch feeder tubes 214, each of which extends outwardly from the main flow tube. The branch feeder tubes 214 are formed of a porous sintered metal or other fluid-permeable material, and allow flow of desorbed fluid thereinto. Each of the branch feeder tubes 214 is of hollow construction, with an interior bore (not shown) which communicates with the central bore 210 of the main flow tube 212. The branch feeder tubes are each of radially extending character to provide pick-up of the desorbate across the entire cross-section of the cylinder vessel.

Below the radially extended branch feeder tubes 214 is an array 218 of alternatively configured branch feeder tubes 216, which are of “weeping,” or outwardly and downwardly arcuate configuration, as shown. Each of the branch feeder tubes 216 is also hollow in construction, with a fluid-permeable wall enclosing the hollow bore (not shown) which also is in fluid flow communication with the central bore 210 of the main flow tube 212.

It will be apparent that the branch feeder tubes may be of any suitable size, shape, and axial or radial distribution, and that other fluid-permeable channel conduit arrangements could be employed, and variously manifolded, to convey flow of desorbate fluid from the bulk volume of the sorbent bed to the vessel port connecting with the dispensing structure for the storage and dispensing system.

The features and advantages of the invention will be more fully apparent from the ensuing examples.

EXAMPLE I

A test system including a gas storage and dispensing cylinder constructed in accordance with the present invention was constructed and tested for efficacy, as described below.

Test Apparatus

Figure 5:
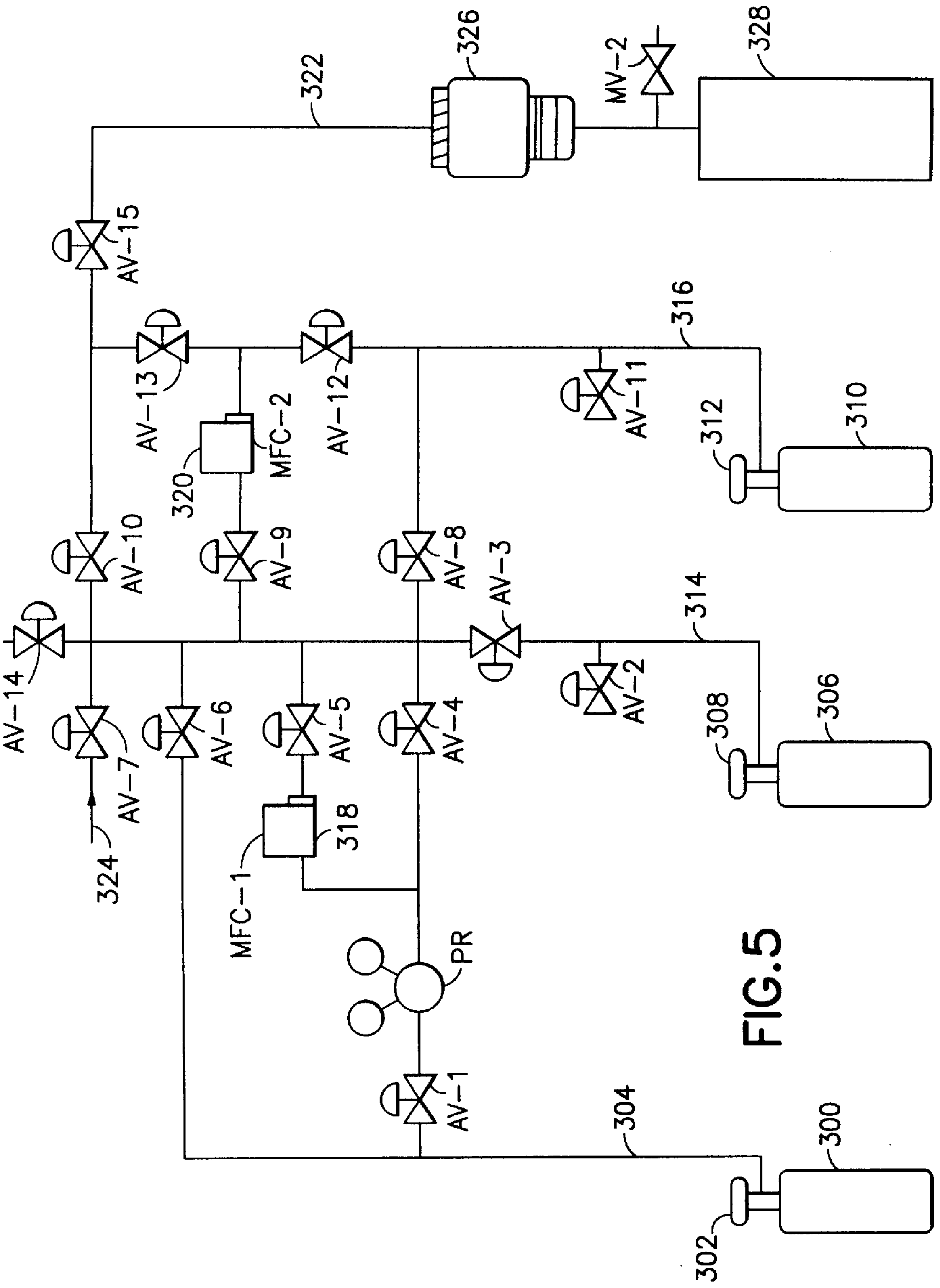
FIG. 5 is a schematic representation of a test setup for evaluation of gas storage and dispensing systems constructed in accordance with the present invention.

A test system was set up as shown in FIG. 5, wherein the sorbate gas was $SF_6$ supplied from source container 300, equipped with a selectively openable/closeable valve 302, joined in flow communication with the manifold by supply line 304. In the manifold, helium (source not shown) is supplied by source line 324. The manifold contains a pressure regulator PR for the sorbate gas. The gas storage and dispensing cylinder 306 was equipped with a discharge valve 308 coupled to manifold line 314. The gas storage and dispensing cylinder 310 was equipped with a discharge valve 312 coupled to manifold line 316. Gas flow rate in the manifold was controlled by means of the mass flow controllers 318 (MFC-1) and 320 (MFC-2). The manifold contained a series of automatic valves (AV-1, AV-2, etc.), and manual flow valves (MV-2) arranged as shown. The discharged gas from the manifold was flowed in discharge line 322 to the discharge gas purifier unit 326 and the system scrubber 328 for discharged gas purification and treatment in the test system.

Gascylinders

Two lecture bottle size gas storage and delivery cylinders 306 and 310 were prepared for the test. Each cylinder was mounted vertically in the test setup manifold assembly as shown schematically in FIG. 5, and had a total length of 11.5 inches (not including the valve), an outside diameter of 2 inches, and an internal volume of 0.44 liter. Cylinder 306 was equipped with a 10.5 inch long×0.375 inch outer diameter (0.25 inch inner diameter) porous frit tube, which was attached to the inside end of the cylinder valve. Cylinder 2 was equipped with a shorter 2 inch×0.375 inch outer diameter (0.125 inch inner diameter) porous frit tube.

Both cylinders were filled with the carbon based adsorbent (Kureha Bead Activated Carbon G-BAC, commercially available from Kureha Chemical Industry Co., Ltd.). After helium leak checking of cylinders, the cylinders were degassed at 180° C. for 12 hours under $1\times10^4$ mmHg vacuum. The adsorbent weight in cylinder 306 was found to be 214 g after degassing, and the adsorbent weight for cylinder 310 was 222 g.

Adsorption

Both cylinders were connected to the test manifold as shown in FIG. 5. After the manifold was helium leak checked and evacuated to ×10–5 mmHg, $SF_6$ was introduced into both cylinders through a mass flow controller. The flow rates were in the range of 100 to 200 sccm. The cylinder pressures were measured by two pressure transducers with an accuracy of 0.1 mmHg.

When the cylinder pressures reached the desired level at room temperatures, the $SF_6$ flow was stopped. After cylinder pressure were stabilized, the amount of $SF_6$ introduced into the cylinders were determined by using the gas flow rate and adsorption time, and subsequently, the $SF_6$ loading on the adsorbent was determined at the final cylinder pressure. Table 1 below summarizes the loadings at three different pressures.

High Flow Desorption

After the cylinder were filled with $SF_6$ to the desired pressures, the cylinders were opened to the vacuum pump for 30 seconds with a base pump pressure of $6\times10^{-5}$ mmHg. When the cylinder pressures were stabilized after the pumping, the pressure difference before and after the pumping was recorded. Based on the pressure difference, the amount of $SF_6$ desorbed was then extrapolated from the adsorption data generated in the adsorption tests, and was used to determine the desorption rate for the respective cylinders. The desorption results were summarized in Table 2 below. The desorption tests for both cylinders were carried out under identical conditions. Both cylinders were connected to the same position of the manifold to eliminate potential interference in desorption rate from the apparatus. The pressure level at the inlet of the vacuum pump were also recorded during the desorption tests, and are summarized in Table 3 below.

Low Flow Desorption

Figure 6:
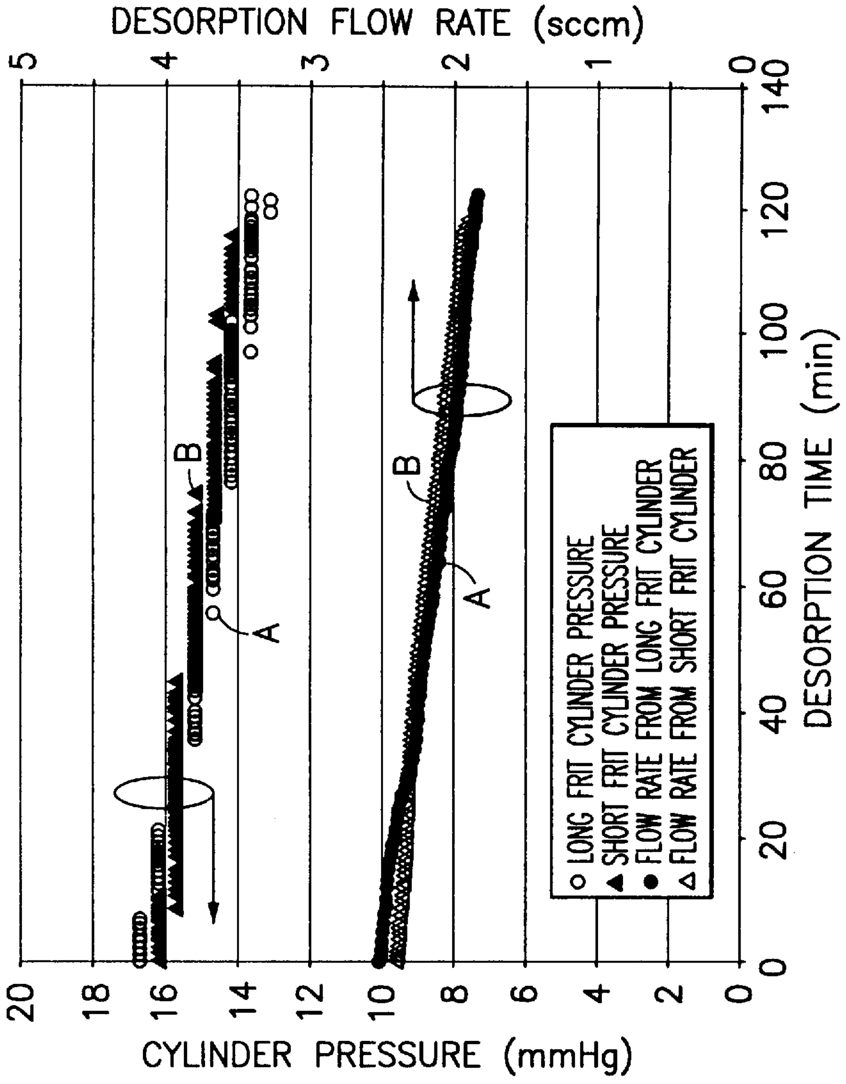
FIG. 6 is a plot of cylinder pressure (in mm Hg) and of desorption flow rate (in standard cubic centimeters), as a function of desorption time in minutes, for a gas storage and dispensing cylinder with a long frit porous tube disposed in the interior volume thereof (curves A) and a gas storage and dispensing cylinder with a short frit porous tube disposed in the interior volume thereof (curves B).

In the low flow desorption tests, the $SF_6$ gas in the cylinders was desorbed to a vacuum pump through a low flow mass flow controller (10 sccm). Both the cylinder pressures and gas flow rates were measured for the cylinders, and are plotted in FIG. 6. FIG. 6 is a plot of cylinder pressure (in mm Hg) and of desorption flow rate (in standard cubic centimeters), as a function of desorption time in minutes, for a gas storage and dispensing cylinder with a long frit porous tube disposed in the interior volume thereof (curves A) and a gas storage and dispensing cylinder with a short frit porous tube disposed in the interior volume thereof (curves B).

Results

In the high flow desorption tests, the long frit cylinder showed ~60% higher desorption rate than the shorter frit cylinder, as based on the amount of gas desorbed from the cylinders. In addition, the higher pressure at the vacuum pump inlet during the desorption of the gas in the long frit cylinder also suggested the long frit cylinder desorbed more $SF_6$. Since all other construction materials were identical, the difference was attributable to the length of the frits. These data support the conclusion that the longer frit gas storage and dispensing cylinder improved the gas transfer rate in the void space of the adsorbent media, relative to the cylinder with the shorter frit (porous tube).

In the low desorption tests, the flow rate difference between the two cylinders was found to be minimum. In the low flow range, the gas flow rate is more limited by the gas desorption rate from the adsorbent pores into gas phase, than by the gas transfer in the void space of the absorbent particles.

TABLE 1

| Cylinder Pressure (mmHg # 21–22° C.) | Loading (g/100 g) |
|---|---|
| 0 | 0 |
| 9.3 | 5.8 |
| 30.4 | 11.9 |
| 122 | 24.4 |

TABLE 2

| | Long Frit | | | Short Frit | | | Difference* |
|---|---|---|---|---|---|---|---|
| Start Pressure (mmHg) | End Pressure (mmHg) | Volume Desorbed (liter) | Desorption Rate (litter/min) | End Pressure (mmHg) | Volume Desorbed (ml) | Desorption Rate (ml/min) | in Desorption Rate % |
| 111 @ 22° C. | 84 | 1.61 | 3.21 | 92 | 1 | 2 | 61 |
| 80 @ 21° C. | 64 | 1.5 | 3 | 69 | 0.995 | 1.99 | 51 |
| 71 @ 20° C. | 58 | 1.39 | 2.78 | 62 | 0.89 | 1.78 | 56 |
| Average | | | | | | | 56 |

*(long frit flow rate − short frit flow rate) × 100/short frit flow rate

TABLE 3

| | Vacuum Level During Desorption (mmHg) | |
|---|---|---|
| Start Pressure | Long Frit | Short Frit |
| 111 @ 22° C. | 3.0 | 2.9 |
| 80 @ 21° C. | 2.9 | 2.6 |
| 71 @ 20° C. | 2.8 | 2.7 |

Thus, while the invention has been shown and described with reference to specific features, aspects and embodiments herein, it will be appreciated that the invention is susceptible of a wide variety of other embodiments, features and implementations consistent with the disclosure herein, and the invention is therefore to be broadly construed and interpreted, within the spirit and scope of the foregoing disclosure.

What is claimed is:

1. A gas storage and dispensing system, comprising:

a vessel defining an interior volume therewithin for containing a bed of adsorbent material having affinity for a gas to be stored at an interior gas pressure not exceeding about one atmosphere and selectively dispensed from the vessel;

a gas adsorbed on the bed of adsorbent material at an interior gas pressure not exceeding about one atmosphere;

means for selectively establishing gas flow communication for discharge of said gas from the vessel; and means disposed in the interior volume of the vessel for reducing the resistance to flow of gas from the adsorbent material bed during establishment of said gas flow communication for discharge of gas from the vessel.

2. A system according to claim 1, wherein said means for selectively establishing gas flow communication for discharge of said gas from the vessel, comprises a valve which is selectively actuatable between open and closed flow positions.

3. A system according to claim 2, wherein said means for selectively establishing gas flow communication for discharge of said gas from the vessel, comprise a mass flow controller for regulating the rate of flow of said gas from the vessel.

4. A system according to claim 1, wherein said means disposed in the interior volume of the vessel for reducing the resistance to flow of gas from the sorbent material bed during establishment of said gas flow communication for discharge of gas from the vessel, comprise an inert packing material in the interior volume of the vessel which is permeable to gas flow.

5. A system according to claim 1, wherein said means disposed in the interior volume of the vessel for reducing the resistance to flow of gas from the sorbent material bed during establishment of said gas flow communication for discharge of gas from the vessel, comprise an inert material dispersed in the sorbent material bed.

6. A system according to claim 5, wherein said inert material comprises glass beads.

7. A system according to claim 1, wherein said means disposed in the interior volume of the vessel for reducing the resistance to flow of gas from the sorbent material bed during establishment of said gas flow communication for discharge of gas from the vessel, comprise a permeable diffusion tube positioned in the sorbent bed for flowing gas out of the sorbent bed for discharge of gas from the vessel.

8. A system according to claim 7, wherein the vessel has a discharge port for said discharge of gas from the vessel.

9. A system according to claim 8, wherein the diffusion tube comprises a straight porous tube joined at one end to the discharge port and extending at an opposite end into the sorbent material bed.

10. A system according to claim 1, wherein the vessel is a vertically elongate cylindrical container, arranged for top-end discharge of gas from the vessel.

11. A system according to claim 1, wherein the vessel is a vertically elongate cylindrical container, arranged for top-end discharge of gas from the vessel and the porous tube extends vertically downwardly from the discharge port to a lower part of the sorbent material bed.

12. A system according to claim 11, wherein the porous tube is of sintered porous metal construction.

13. A system according to claim 12, wherein the porous tube is substantially coextensive in length with the vessel.

14. A system according to claim 1, further comprising activated carbon sorbent material in said adsorbent material bed.

15. A gas storage and dispensing system according to claim 1, wherein the vessel comprises a single gas flow port for gas flow communication.

16. A gas storage and dispensing system according to claim 1, wherein the gas is selected from the group consisting of hydride gases, halide gases and organometallic Group V compounds.

17. A gas storage and dispensing system according to claim 1, wherein said adsorbent material comprises bead activated carbon adsorbent material, and said gas is selected from the group consisting of hydride gases, halide gases and organometallic Group V compounds.

18. A gas storage and dispensing system, comprising:

a vertically upstanding cylindrical vessel defining an interior volume therewithin containing a bed of adsorbent material having affinity for a gas to be stored at an interior gas pressure not exceeding about one atmosphere and selectively dispensed from the vessel;

a gas adsorbed on the bed of adsorbent material at an interior gas pressure not exceeding about one atmosphere;

means for selectively establishing gas flow communication for top-end discharge of said gas from the vessel, including a discharge port at a top end of the vessel and a gas flow controller coupled to the gas discharge port; and a porous tube permeable to gas flow, coupled to the gas discharge port and extending downwardly in the interior volume of the vessel, for reducing the resistance to flow of gas from the adsorbent material bed during establishment of said gas flow communication for discharge of gas from the vessel.

19. A gas storage and dispensing system according to claim 18, wherein the vessel comprises a single gas flow port for gas flow communication.

20. A gas storage and dispensing system according to claim 18, wherein said gas is selected from the group consisting of hydride gases, halide gases and organometallic Group V compounds.

* * * * *

UNITED STATES PATENT AND TRADEMARK OFFICE

CERTIFICATE OF CORRECTION

PATENT NO. : 5,851,270

DATED : December 21, 1998

INVENTOR(S) : Olander et al.

It is certified that error appears in the above-identified patent and that said Letters Patent is hereby corrected as shown below:

Column 9, line 39: "Gascylinders" should be --Gas cylinders--

Column 9, line 61: "to x10-5 mmHg,$SF_6$" should be --to 6x10-5 mmHg,$SF_6$--

Column 10, line 61: (in Table 1) "(mmHg #21-22°C.)" should be --(mmHg@21-22°C.)--

Signed and Sealed this

Thirteenth Day of July, 1999

Attest:

Q. TODD DICKINSON

Attesting Officer

*Acting Commissioner of Patents and Trademarks*